Dec. 30, 1952 E. R. WIGAN 2,623,945

ADJUSTABLE ELECTRICAL PHASE-SHIFTING NETWORK

Filed May 9, 1946 2 SHEETS—SHEET 1

INVENTOR
EDMOND RAMSAY WIGAN
BY Philip M. Bolton
ATTORNEY

Dec. 30, 1952 E. R. WIGAN 2,623,945

ADJUSTABLE ELECTRICAL PHASE-SHIFTING NETWORK

Filed May 9, 1946 2 SHEETS—SHEET 2

INVENTOR
EDMUND RAMSAY WIGAN
BY Philip M. Bolton
ATTORNEY

Patented Dec. 30, 1952 2,623,945

UNITED STATES PATENT OFFICE 2,623,945

ADJUSTABLE ELECTRICAL PHASE-SHIFTING NETWORK

Edmund Ramsay Wigan, Bournemouth, England, assignor to International Standard Electric Corporation, New York, N. Y., a corporation of Delaware Application May 9, 1946, Serial No. 668,610
In Great Britain January 9, 1945

Section 1, Public Law 690, August 8, 1946
Patent expires January 9, 1965

6 Claims. (Cl. 178—44)

The present invention relates to electrical phaseshifting networks, with particular reference to networks which may be conveniently adjusted to produce a zero phase shift at any desired frequency in a given range of frequencies.

The invention is of particular advantage when applied to the frequency determining network of an oscillator of the resistance-reactance type, which includes a coupling network of the L type, having a series arm and a shunt arm both of which include resistive and reactive elements, the frequency of oscillation being substantially that for which the phase shift produced by the network is zero. Such a network may also be used in frequency meters.

As will be explained more fully later, in the present invention an adjustable impedance element is added to the conventional L network of the resistance-reactance type, and by means of this adjustable element, the frequency of zero phase shift may be varied over a certain range, while the network may also be designed so that the voltage transfer ratio of the network at the frequency of zero phase shift is independent of the frequency, and is determined by the series and shunt arms of the network. This is a valuable property of the invention because it enables the frequency of an oscillator to be varied without varying the output level, and further if the adjustable impedance element be adapted to be varied in some way under the control of a signal (for example, if the element should be a microphone), substantially pure frequency modulation unaccompanied by amplitude modulation will be obtained in a very simple manner.

The invention accordingly provides an electrical phase shifting network including resistive and reactive impedance elements arranged in series and shunt arms of the network, and comprising an additional impedance element connecting a point in a series arm with a point in a shunt arm, the arrangement being such that the phase shift produced by the network is zero at a frequency which depends on the magnitude of the additional element.

The invention will be described with reference to the accompanying drawings, in which.

Figure 1:
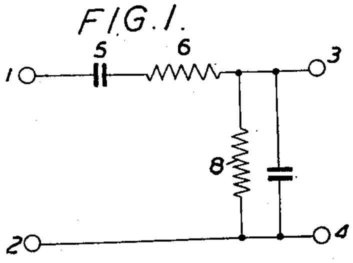
Fig. 1 shows a schematic circuit diagram of a known type of phase shifting network.
Figure 2:
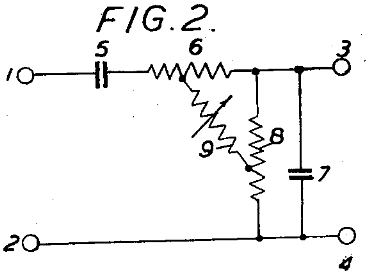
Fig. 2 shows the network of Fig. 1 modified according to the invention, to give one example illustrating the invention.

Fig. 1 shows a coupling network of well known type often employed in a resistance-reactance type of oscillator. The input terminals 1, 2 are connected to the output terminals 3, 4 by a series arm including a condenser 5 in series with a resistance 6, and a shunt arm including a condenser 7 in parallel with a resistance 8. Fig. 2 shows one particular example of a network according to the present invention, and is the same as Fig. 1 with the addition of a resistance 9 (which may be variable) connecting a point in the resistance 6 with a point in the resistance 8. It can be shown that by proper proportioning of the elements of the network, the phase shift between the terminals 1, 2 and the terminals 3, 4 can be made zero at a particular frequency, and moreover, if the resistance 9 be made adjustable, the frequency of zero phase shift may be varied over a certain range. In addition, the elements of the network may be so designed that the voltage transfer ratio, that is, the ratio of the output voltage to the input voltage, at the frequency of zero phase shift, is constant.

Figure 3:
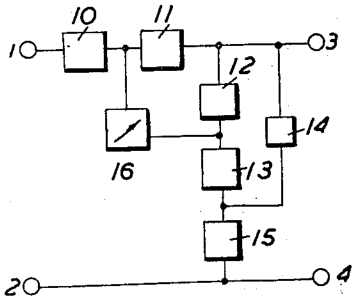
Fig. 3 shows a block schematic diagram of the most general network according to the invention.

Fig. 2 is, however, only one possible form of the network according to the invention, which is indicated more generally in Fig. 3. The series arm includes two series impedances represented by blocks 10 and 11, and the shunt arm includes two impedances 12 and 13 connected in series, and shunted by another impedance 14, still another impedance 15 being connected in series with the combination of 12, 13 and 14. The adjustable impedance 16, which is the principal characteristic of the invention, is connected between the junction points of impedances 10 and 11, and impedance 12 and 13.

Some of the blocks 10 to 15 may include both resistance and reactance elements; and the series and shunt arms of the network must each of them include at least one resistance element and at least one reactance element. The impedance 16 can be either a variable resistance or a variable reactance. The impedance 15 is not an essential element and may be omitted, but when used will generally be a resistance element. It will be understood, of course, that reactance elements may be condensers or inductances. Usually, also, the impedances 11, 12, 13 and 16 will be all of the same kind, that is, they will be all resistances, or all reactances of the same sign.

It will be understood, also, that the networks included in Fig. 3 can generally be replaced by equivalent networks with the elements arranged in other ways, according to well known principles.

The elements of the network of Fig. 3 may be designed to fulfil desired conditions by solution of the network according to well known principles, but the general solution is involved and tedious, and accordingly the solution in one or two typical cases will be quoted. It is always assumed that the impedance to which the terminals 3 and 4 are connected is substantially infinite.

Figure 4:
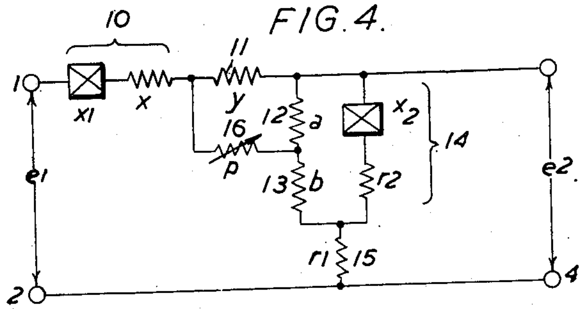
Fig. 4 shows a schematic circuit diagram which includes a group of networks according to the invention.

In the particular case of Fig. 3 shown in Fig. 4, the impedance 10 consists of an element of reactance $X_1$ in series with a resistance $x$. The impedance 14 consists of an element of reactance $X_2$ in series with a resistance $r_2$. The impedances 11, 12, 13, 15 and 16 are resistances $y$, $a$, $b$, $r_1$ and P respectively. It will be understood that the reactances $X_1$ and $X_2$ may be represented either by condensers or by inductances.

The following additional symbols will be used:

$R_1=x+y$; $R_2=a+b$;
$R_1/R_2=M$; $X_1/X_2=N$;
$r_1/R_1=A$; $r_2/R_2=D$;
$X/R_1=q$; $a/R_2=p$;
$(1-q)/p=B$; $y/a=d$;

$$K=(P+a+y)/(a+y)$$

Voltage transfer ratio $e_2/e_1=L$;

It follows that $BM=d$

It will be first assumed that $r_2=0$

Then it can be shown that the condition for zero phase shift is $$X_1X_2/R_1R_2=(1-NA)/(1+MA)-p[d^2/M+(1-NA)/(1+MA)]/(P/pR_2+1+d) \quad (1)$$

In practice it is usually desirable to be able to choose the value of the voltage transfer ratio L. It can be shown that at the frequency of zero phase shift, and when the network elements have been chosen so that L is the same at all such zero-phase-shift frequencies, $$1/L=1+(M+N)/(1+MA) \quad (2)$$

Equation 1 may then be written in a slightly different form using Equation 2

$$X_1X_2=R_1R_2(1-NA)/(1+MA)-[R_2y^2+a^2(R_1+r_1)-a^2r_1/L]/K(a+y) \quad (3)$$

A number of different pairs of values of $p$ and $q$, which satisfy the conditions, are possible. These parameters determine the tapping points on the series and shunt arms to which the resistance P is connected. Such pairs of values may be determined from one or other of the following equations, which are equivalent—

$$1/L=1+BM+N/(1+BM) \quad (4)$$
$$1/L=1+d+N/(1+d) \quad (5)$$

The frequency of zero phase shift may be determined from Equation 1 or 3 since it occurs in the reactances $X_1$ and $X_2$. For example, if $f$ is this frequency and if $X_1$ and $X_2$ are represented by condensers of capacities $C_1$ and $C_2$ then $$X_1X_2=1/4\pi^2f^2C_1C_2$$

If $X_1$ and $X_2$ are represented by inductances $L_1$ and $L_2$, then $X_1X_2=4\pi^2f^2L_1L_2$.

It will be noted from Equation 1 that when P is infinite, then the corresponding limiting value of the zero-phase-shift frequency is that frequency for which $$X_1X_2=R_1R_2(1-NA)/(1+MA)=R_1R_2-r_1R_2(1/L-1) \quad (6)$$

When P is zero the corresponding limiting value of the zero-phase-shift frequency is that frequency for which $$X_1X_2=R_1R_2(1-NA)/(1+MA)-[R_2y^2+a^2(R_1+r_1)-a^2r_1/L]/(a+y) \quad (7)$$

From Equation 3, since $K=1$ when $P=0$.

Equation 7 indicates that when $X_1$ and $X_2$ are negative reactances, $r_1$ may be chosen so that the limiting zero-phase-shift frequency is infinite when $P=0$. Likewise when $X_1$ and $X_2$ are positive reactances $r_1$ may be chosen so that the limiting zero-phase-shift frequency is zero when $P=0$. In both cases, of course, $X_1X_2$ is zero.

It is not practicable to give any very definite directions as to the choice of values for the elements of the network to fulfil specified conditions, because the possibilities of choice are rather wide and the procedure will often be determined by such factors as the limitations set by the design or availability of certain of the elements. However, the process may be somewhat as follows:

When designing a network to cover a certain frequency range the first step is to choose a value of L which is suitable for the circuit associated with the network; for example, when the network is used in an oscillator, the value of L will be determined at least in part by the gain of the associated amplifier.

The parameters M, N and A are then chosen to satisfy Equation 2. Unless a wide range of variation of the zero-phase-shift frequency by adjustment of P is required, A may be made zero by making $r_1$ zero. The tapping points to which the resistance P are to be connected are determined from Equation 4 or 5 from which $d$ is found, and therefore B may be determined, since M has been already fixed.

Any value of $p$ may now be selected, and from the value of B just determined the corresponding value of $q$ is found. If a wide range of variation of the zero-phase-shift frequency is desired, a large value of $p$ should be chosen. All the quantities in Equation 1 are now fixed except the individual values of $X_1X_2R_1$ and $R_2$.

Let it be assumed that $X_1$ and $X_2$ are produced by condensers $C_1$ and $C_2$. Then the lowest frequency of the range will be obtained for the maximum practicable value of P, and the highest frequency when $P=0$. A trial choice of values of $R_1$, $R_2$, $C_1$ and $C_2$ should be made on the assumption that P is disconnected, in order to obtain the lowest desired zero-phase-shift frequency. If $R_2$ can conveniently be given a value small compared with the highest practicable value of P, then this lowest frequency will not be much affected when P is connected and set to its maximum value. A suitable value of $p$ may now be found from Equation 1 in order to obtain the highest desired zero-phase-shift frequency when P has its smallest practicable value. Then $q$ is determined from the value of B as already mentioned.

Figures 5, 6, 10, 11, 12:
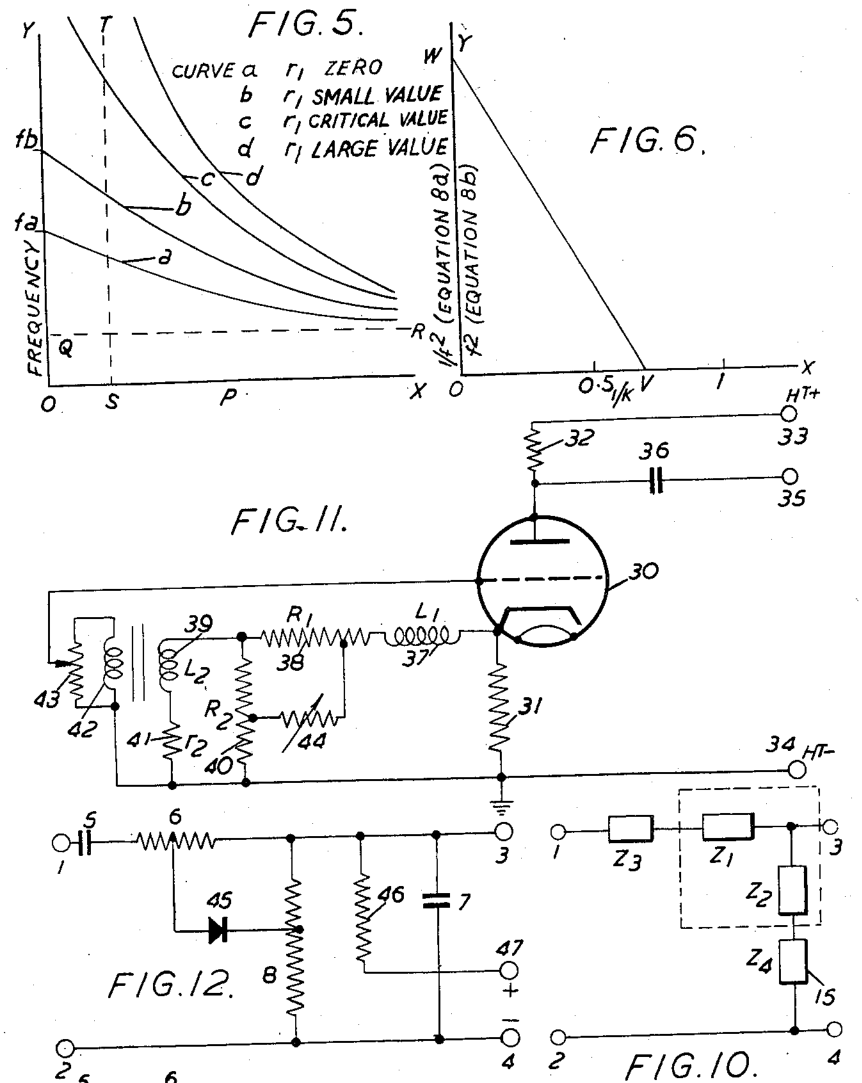
Figs. 5 and 6 show characteristic curves of networks according to the invention.
Fig. 11 shows a schematic circuit diagram of an oscillator incorporating a network according to the invention.
Figs. 12 and 13 show modifications of the networks of Fig. 2.

The manner in which the performance of the network of Fig. 4 (in which the reactances $X_1$ and $X_2$ are represented by condensers) depends on the value of the resistance $r_1$ is shown in Fig. 5, in which the zero-phase-shift frequency $f$ is plotted against the value of P. The curve (*a*) represents the case when $r_1=0$, and is asymptotic to a line QR parallel to OX, which line cuts the axis OY at the point Q representing the minimum value of $f$ when P is infinite. The curve (*a*) cuts the axis OY at a point corresponding to the maximum zero-phase-shift frequency $fa$ when P=0. When $r_1$ has a small value, the corresponding curve (*b*) lies above the curve (*a*) and cuts the axis OY at a point corresponding to a higher maximum frequency $fb$.

The curve (*c*) represents the special critical case when the value of $r_1$ has been chosen so that $f$ is infinite when P is zero. This curve is asymptotic to OY.

The curve (*d*) shows the case when $r_1$ has a value larger than the critical value. This curve is asymptotic to a line ST parallel to OY and cutting the axis OX in a point S corresponding to the minimum value of P for which any zero-phase-shift frequency is possible.

It will be evident from Equation 6 that each of the curves (*a*), (*b*), (*c*), (*d*) will be asymptotic to a different line parallel to OX. Only the line QR corresponding to curve (*a*) has been shown, in order to avoid confusing the figure.

It should be pointed out that the degree of separation of the curves (*a*), (*b*), (*c*), (*d*) depends on the value of $p$ which has been selected. When a relatively large value of $p$ is chosen, the curves are well separated, as shown in Fig. 5; but for smaller values, the curves (*b*), (*c*) and (*d*) tend to move closer together, and to curve (*a*), and as $p$ approaches zero they will all tend to coincide with curve (*a*).

The curves of Fig. 5 also represent the case in which the reactances $X_1$ and $X_2$ are provided by inductances, so long as the scale of ordinates along OY is in terms of $1/f$ instead of in terms of $f$.

When all the elements of the network have been selected, the Equation 3 may be written in the form $$(a)\quad 1/f^2=A_1-A_2/K$$

or  (8)

$$(b)\quad f^2=A_3-A_4/K$$

where $A_1A_2A_3$ and $A_4$ are constants, the forms (*a*) and (*b*) corresponding respectively to the cases in which the reactances $X_1$ and $X_2$ are provided by condensers and inductances.

Equations 8 show in the simplest form the relation between P (which is contained in K) and the corresponding zero-phase-shift frequency.

Fig. 6 shows $1/f^2$ for Equation 8(*a*) (or $f^2$ for Equation 8(*b*)) plotted against $1/K$ for the case in which $r$ is larger than the critical value (curve (*d*), Fig. 5). The curve is a straight line cutting the axis OX and OY in V and W such that $OW=A_1$(or $A_3$) and the tangent of the angle OVW is $A_2$ (or $A_4$). The value OV of $1/K$ for infinite (or zero) zero-phase-shift frequency is less than 1, so that P has a minimum value corresponding to OS in Fig. 5. If the critical value of $r_1$ is chosen (curve (*c*), Fig. 5), then the point V in Fig. 6 will be such that $OV=1$, and the whole of the range of P can then be used. This condition gives the largest range of variation of the zero-phase-shift frequency.

Referring again to Fig. 4, if $r_1$ is zero and $r_2$ is not zero, it can be shown that the equations corresponding to (1), (2) and 3 are respectively:

$$X_1X_2/R_1R_2=1-ND(1+D)/M-p(1+d^2/M-ND/M)/(P/pR_2+1+d) \quad (9)$$

$$1/L=1+M+N/(1+D) \quad (10)$$

$$X_1X_2=R_1R_2-r_2RN(1+D)-a(R_1+d^2R_2-Nr_2)/K(1+d) \quad (11)$$

Equations 4 and 5 remain unchanged.

In this case the various parameters may be chosen in a manner similar to that explained above.

The equations corresponding to Equations 6 for the limiting zero-phase-shift frequency when P is infinite are $$X_1X_2=R_1R_2-R_2R_2N(1+D)=R_1R_21-ND(1+D)/M \quad (12)$$

It will be understood that although for convenience the cases in which $r_1=0$ and $r_2=0$ have been treated separately, networks may be used in which neither $r_1$ nor $r_2$ is zero.

It has already been pointed out that the reactances $X_1$ and $X_2$ of Fig. 4 may be positive or negative. Another series of networks according to the invention may be obtained by replacing the reactances $X_1$ and $X_2$ by resistances and the resistances $x_1$, $y$, $a$, $b$ and $P$ by reactances all of the same kind.

Figure 7:
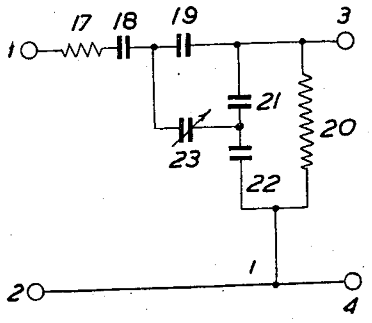
Figs. 7, 8, 9 and 10 show schematic diagrams of particular networks according to the invention.

Fig. 7 shows a typical example of one of these networks using capacitative reactances. The series arm of the network comprises a resistance 17 connected in series with two condensers 18 and 19, and the shunt arm comprises a resistance 20 in parallel with two series connected condensers 21 and 22. A variable condenser 23 is connected between the junction point of the condensers 18 and 19 and the junction point of the condensers 21 and 22.

A resistance $r_1$ (not shown) could be connected in series with the whole of the shunt arm (in the manner shown in Fig. 4) if the performance indicated by curve (*b*), (*c*) or (*d*) of Fig. 5 is required. Alternatively a condenser (not shown) having a reactance D times the reactance of the condensers 21 and 22 taken in series, may be connected in series with the resistance 20 to give the performance just referred to, or both the resistance and the condenser may be provided.

For the network of Fig. 7, Equation 1 will be modified as follows:

$$R_1R_2/X_1X_2=(1-NA)/(1+MA)-p[d^2/M+(1-NA)/(1+MA)]/(P/pX_2+1+d) \quad (13)$$

Equation 4 is changed as follows:

$$1/L=1+BN+M/(1+BN) \quad (14)$$

Equation 2 will be unchanged.

Figure 8:
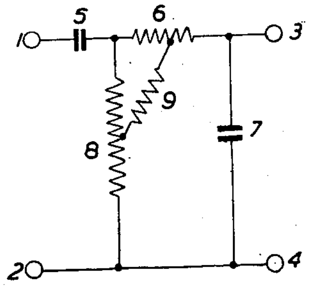

Fig. 8 shows another circuit according to the invention, which can be shown by well known network transforming methods to be identically equivalent to the circuit of Fig. 2. It will be noted that Fig. 8 differs from Fig. 2 in that the upper end of the shunt resistance 8 is connected to the opposite end of the series resistance 6. If the capacities of condensers 5 and 7 in Fig. 8 are respectively equal to the capacities of condensers 7 and 5 in Fig. 2, then both networks have the same relation between the value of P and the zero-phase-shift frequency, but the value of L is different unless the capacities of condensers 5 and 7 are equal in each network. All the networks covered by Fig. 4 can be transformed in a similar way.

It may be pointed out that the networks including condensers are suitable for high frequencies. Then there is always a finite lower limit to the zero-phase-shift frequency, but the upper limit, which occurs when P approaches zero, can be made infinite if suitably proportioned resistances $r_1$ and/or $r_2$ be included. Likewise those including inductances are more suitable for low frequencies. Then there is always a finite upper limit to the zero-phase-shift frequency, but the lower limit, which occurs when P approaches zero, can be made zero by means of the resistances $r_1$ and/or $r_2$.

It should be noted, also, that the zero-phase-shift frequency can be adjusted in an alternative manner, namely by keeping P fixed and simultaneously varying the tapping points on the series and shunt arms of the networks in such manner that $p$ and $q$ fulfil the conditions of Equation 4 or 5 or 14.

This is quite a practical scheme when the elements $x$, $y$, $a$, $b$ and P are resistance elements, since the relation between $p$ and $q$ is linear. The arrangement is also theoretically possible though hardly practicable, if these elements are condensers as in Fig. 7. When these elements are resistive, the highest frequency is obtained when $q=0$ or $p=1$, when $X_1$ and $X_2$ are negative reactances of the lowest frequency when they are positive reactances.

Figure 9:
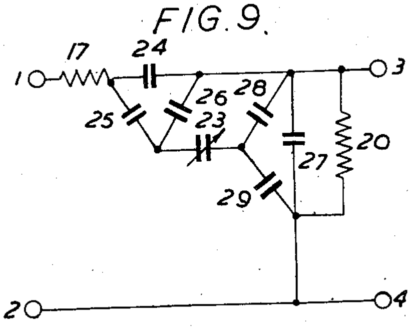

As it may be inconvenient to divide the series and shunt impedance elements of the network in order to obtain the tapping points for the adjustable element P, the same result may be achieved in a different way, an example of which is shown in Fig. 9 which is a modication of Fig. 7. In Fig. 9 the condenser 24 replaces the two condensers 18 and 19 of Fig. 7, and is shunted by two other condensers 25 and 26 connected in series. Likewise the condenser 27 replaces the two condensers 21 and 22 of Fig. 7 and is shunted by the two condensers 28 and 29 connected in series. The condenser 23, which represents the variable element P, is connected between the junction points of the condensers 25 and 26 and of the condensers 28 and 29 respectively. The capacities of the condensers 24, 25 and 26 will be chosen so that if the deltas 24, 25, 26 and 27, 28, 29 be supposed replaced by the equivalent T arrangements, the capacities of the T which act effectively in series with the resistance 17 are respectively equal to the capacities of condensers 18 and 19 of Fig. 7. Similarly the effective series capacities of the T network equivalent to the delta 27, 28, 29 should be respectively equal to the capacities of the two condensers 21 and 22.

The arrangement then operates in the same way as that of Fig. 7, except that an additional reactance contributed by the shunt arms of the equivalent T networks acts effectively in series with the variable element 23, so that this additional reactance must be included in the value of P, and sets a limit to its minimum value.

A similar delta arrangement can evidently be used in a network similar to Fig. 2 in which each of the resistances 6 and 8 could be shunted by a tapped resistance, the resistance 9 being connected between the two taps. The values of the resistances would be chosen according to the same principles as in Fig. 9. Clearly, also an arrangement similar to Fig. 9 could be used in which all the condensers are replaced by inductances.

It is evident also, that the delta arrangement could be used, if desired, for only one of the arms of the network.

This delta arrangement may be found convenient in order to avoid tapping a precision element. Thus in Fig. 9, the condensers 24 and 27 may be high grade adjustable condensers in order to provide a number of different frequency ranges. In such a case tapping these condensers would be impracticable, and the additional condensers such as 25 and 26 can conveniently be provided with the proper capacity ratio, and would not need to be changed when the condenser 24 is changed. This device is also useful in other circumstances, an example of which occurs in Fig. 12.

Referring again to Fig. 3, the introduction of the impedance 15 may be treated in a slightly different manner. Suppose that the elements 10 to 14 and 16 have been designed according to the principles already explained so that a constant voltage transfer ratio at the zero-phase-shift frequency, determined by the adjustment of element 16, has been obtained. Then for given setting of this element, the network is equivalent to the portion inside the dotted outline of Fig. 10, which consists of a series impedance $Z_1$ and a shunt impedance $Z_2$ whose values can be calculated according to well known principles from the values of the elements 10 to 14 and 16. The voltage transfer ratio L will be $Z_2/(Z_1+Z_2)$ which, as already stated, will be constant at the zero-phase-shift frequency for adjustments of the element 16. If now the element 15 of impedance $Z_4$ be introduced in series with $Z_2$, then the voltage transfer ratio of the whole network of Fig. 10 will still be equal to L provided with an impedance $Z_3$ is introduced in series with $Z_1$, as shown, having the value $(1-L)Z_4/L$. The relation between the value of P and the zero-phase-shift frequency will be unchanged. It will be understood that $Z_3$ and $Z_4$ can be any type of impedances whatever, provided that their ratio is $\mu=(1-L)/L$ independent of frequency. Thus, for example, if $Z_4$ comprises an inductance $L_0$ in parallel with a series combination of a condenser of capacity $C_0$ and a resistance $R_0$, then impedance $Z_3$ will be an inductance $\mu L_0$ in parallel with a series combination of a condenser of capacity $C/\mu$ and a resistance $\mu R_0$. It is evident that $Z_3$ and $Z_4$ could comprise single impedance elements of any type, or any kind of network of such elements.

It will be understood that the impedances $Z_3$ and $Z_4$ may be introduced in this manner whether or not $r_2$ is included in the shunt arm of the original network, and whatever be the form of the original network. The value of L to be used is in all cases that of the original network before $Z_3$ and $Z_4$ have been introduced.

When, as in the case first treated above, the impedance $Z_4$ is a resistance $r_1$ and when no corresponding impedance $Z_3$ is included in the series arm, then the relation between P and the zero-phase-shift frequency is affected by $r_1$, according to Equations 1 and 3 and the curves shown in Fig. 5.

In order further to illustrate the invention, some particular cases will be quoted. A simple case of Fig. 2 is that for which $$R_1=R_2=R;\ C_1=C_2=C;\ \text{and}\ r_1=r_2=0$$

From Equation 2 it follows that $L=\frac{1}{3}$. If $q$ is chosen equal to zero, so that the variable resistance P is connected to the junction point C and R in the series arm, then it follows from Equation 4 or 5 that $p=0.618$.

It can be shown from Equation 1 by putting $P=0$ and $P=\infty$ therein, that the ratio of the maximum to the minimum zero-phase-shift frequency is 2.618.

Note that the resistance of $L_1$ is included in $R_1$; and $r_2$ represents the whole of the resistance of $L_2$, so that no actual element had to be supplied for $r_2$.

The following measured values of the zero-phase-shift frequency were obtained for various value of P:

| | | | | | | | | | | |
|---|---|---|---|---|---|---|---|---|---|---|
| P (ohms) | 0 | 50 | 100 | 200 | 250 | 500 | 1,000 | 2,000 | 3,000 | ∞ |
| f (C./S.) | 113 | 130 | 144 | 167 | 176 | 214 | 260 | 308 | 354 | 420 |

This simple case gives a rather small total variation of the zero-phase-shift frequency, and as already explained, the introduction of a suitable resistance $r_1$ will enable this range to be extended to infinity. A suitable value of $r_1$ can be obtained by solving Equation 1 for A when the left hand side is put equal to zero.

In the particular case in which $R_1=R_2=R$; and $C_1=C_2=C$; $r_2=0$; the values of $p$ and $q$ were ⅔ and ⅓ respectively. This gives an infinite zero-phase-shift frequency for $P=0$; and the corresponding value of L is 0.4. It can be seen from Equation 1 or 3 that the zero-phase-shift frequency for $P=\infty$ is given by $1/f=\sqrt{2}.\pi RC$. For the special case in which $R=1065$ ohms $C=0.1555\mu f.$ and $r_1=354$ ohms, the following measured value of the zero-phase-shift frequency $f$ for various values of P were obtained:

| | | | | | |
|---|---|---|---|---|---|
| P (ohms) | ∞ | 5,000 | 361 | 110.5 | 52.0 |
| f (C./S.) | 1,360 | 1,536.5 | 3,000 | 5,000 | 7,000 |

If in this case a compensating resistance $Z_3$ for $r_1$ be included in the series arm in the manner explained with reference to Fig. 10, the value of L for the network without $r_1$ is now ⅓ (from Equation 2 since $A=0$) so $\mu=2$, and the value of $Z_3$ should be $2r_1=708$ ohms. The zero-phase-shift frequency for $P=0$ will however not be infinite, since $r_1$ no longer affects the frequency characteristic.

Two numerical examples will be given for the network of Fig. 4; in the first of which $X_1$ and $X_2$ are negative reactances represented by condensers of capacities $C_1$ and $C_2$, and in the second of which $X_1$ and $X_2$ are positive reactances represented by inductances $L_1$ and $L_2$.

*Case 1*

$R_1=1070$ ohms $\quad p=0.255$
$R_2=1053$ ohms $\quad q=0.110$
$C_1=0.098\mu f$ $\quad M=1{,}015$
$C_2=0.398\mu f$ $\quad N=4.04$
$r_1=112$ ohms $\quad A=0.105$
$r_2=0$ $\quad L=0.18$ The following measured values of the zero-phase-shift frequency $f$ were obtained for various values of P:

| | | | | | | | |
|---|---|---|---|---|---|---|---|
| P (Ohms) | ∞ | 5,550 | 2,020 | 1,091 | 590 | 496 | 485 |
| f (C./S.) | 1,040 | 1,200 | 1,500 | 2,000 | 4,000 | 8,000 | 10,000 |

The value of P when $f=\infty$ is about 480 ohms, so that smaller values of P cannot be used.

*Case 2*

$R_1=1100$ ohms $\quad p=0.835$
$R_2=1053$ ohms $\quad q=0.030$
$L_1=0.206$ henry $\quad M=1.043$
$L_2=0.728$ henry $\quad N=0.265$
$r_1=0$ $\quad D=0.114$
$r_2=120$ ohms $\quad L=0.43$ A final numerical example of Fig. 7 will be given:

$R_1$ (resistance of 17) $=2000$ ohms
$R_2$ (resistance of 20) $=1000$ ohms
$C_1$ (capacity of 19) $=0.114\mu f.$
$C_x$ (capacity of 21) $=0.3114\mu f.$
$C_y$ (capacity of 22) $=0.3105\mu f.$
$r_1$ (in series with shunt arm) $=30$ ohms
$C_2$ ($C_x$ and $C_y$ in series) $=0.1555\mu f.$
$M=2$
$N=1{,}365$
$A=.015$
$L=0.233$ Element 18 was short-circuited, so $q=0$
$p=0.5$ The following measured values of the zero-phase-shift frequency are obtained for various values of the capacity $C_p$ of the condenser 23:

| | | | | | | | |
|---|---|---|---|---|---|---|---|
| $C_p$ (µf.) | 0 | 0.02 | 0.06 | 0.1 | 0.2 | 0.4 | 0.5 |
| f (C./S.) | 866 | 790 | 691 | 628 | 539.5 | 460 | 438.5 |

Fig. 11 shows an oscillator circuit employing one of the networks according to the invention. The arrangement of Fig. 4 in which the reactances $X_1$ and $X_2$ are represented by inductances $L_1$ and $L_2$ is particularly convenient for this purpose, and results in a very simple circuit. In Fig. 11 a thermionic valve 30 has a resistance 31 connected in series between the cathode and ground. The anode is connected through a suitable anode resistance 32 to the positive terminal 33 for the high tension supply source (not shown), the grounded negative terminal of which is 34. The output oscillations may be taken from terminal 35 connected to the anode through a blocking condenser 36.

The cathode circuit of the valve is connected to the control grid circuit by a network according to the invention comprising a series arm including an inductance coil 37 ($L_1$) and a tapped resistance 38 ($R_1$); and a shunt arm including an inductance coil 39 ($L_2$) and a tapped resistance 40 ($R_2$), a resistance 41 ($r_2$) being shown connected in series with the inductance coil 39. It will be understood that the resistance 41 includes the resistance of the coil 39 and may not be represented by any actual element.

The inductance coil 39 is also the primary winding of a transformer, the secondary winding 42 of which is connected to a high resistance potentiometer 43 and has one terminal connected to ground. The adjustable contact of the potentiometer 43 is connected to the control grid of the valve 30. An adjustable resistance 44 (P) is connected between the tapping points on the resistances 38 and 40.

The transformer formed by the coils 39 and 42 may have a step-up ratio of the order of 3:1, and the potentiometer 43 should have a very high resistance so that the inductance $L_2$ is substantially the primary inductance of the transformer.

Since there is substantially a zero phase change between the control grid and cathode of an amplifying valve arranged in the manner of Fig. 11, oscillations will occur at the zero-phase-shift frequency of the coupling network.

It will be clear, therefore, from what has been explained, that the network may be designed to obtain any desired range of oscillation frequencies by adjustment of the single resistance element 44; and moreover, the amplitude of the oscillations may be made practically independent of the frequency. The value of L for the network should be chosen suitably in relation to the transformer ratio and to the gain of the amplifier, and the potentiometer 43 provides a convenient fine adjustment for L to enable the oscillation condition to be correctly set.

It will be understood that the output may be taken from the valve 30 in various other ways. For example, a separate amplifying valve (not shown) may be provided, with its control grid (or cathode) connected directly to the control grid (or cathode) of the valve 30. In this case the resistance 32 and condenser 36 will not be needed.

Attention is however drawn to the fact that the conditions for constant voltage transfer ratio L are only approximately fulfilled in the circuit of Fig. 11 because of the presence of the resistance $r_2$ in series with $L_2$. The voltage applied to the control grid of the valve 30 should ideally be proportioned to the voltage across the resistance 40, but it will be seen that in Fig. 11, the voltage applied to the control grid is proportional to the voltage across $L_2$, which is slightly different on account of the presence of $r_2$. However, if $r_2$ is small, and/or the range of variation of the element 44 is small, the value of L will vary only slightly as this element is adjusted.

As already mentioned, the circuit of Fig. 11 provides a particularly simple oscillation circuit. However, any of the other networks which have been described may be used to couple the cathode to the control grid of the value 30, with the bias and other operating arrangements for the valve modified where necessary, as will be understood by those skilled in the art. A step-up transformer will be required between the output of the network and the control grid, because the voltage amplification factor of the valve 30 arranged as a cathode follower is always less than 1. Such a transformer should be designed to have a very high primary impedance otherwise an appreciable phase shift may be introduced which might result in a corresponding small variation in the voltage transfer ratio. It is however the particular advantage of the network shown in Fig. 11 that the primary winding of this transformer can form an integral part of the network.

It will be understood also, that any of the networks according to the invention may be used in the usual two-valve resistance reactance oscillator circuits in which the anode of each valve is coupled to the control grid of the other, one of the couplings including the network which determines the frequency.

Owing to the fact that the oscillation amplitude can be independent of the frequency, an oscillator employing a network according to the invention may be very easily used to produce frequency modulated waves without any accompanying amplitude modulation. Thus, for example, in an oscillation circuit employing any of the networks of Fig. 4, the element 16 need only be replaced by a carbon microphone, the resistance of which, as is well known, varies in accordance with the pressure of the sound waves which impinge on the diaphragm. The circuit being designed to generate a suitable carrier frequency, the output waves will be frequency modulated in accordance with the speech signals, without any amplitude modulation.

It is, however, well known that the operation of a carbon microphone is non-linear, since the resistance varies more rapidly for outward excursions of the diaphragm than for inward excursions. This effect can be very conveniently corrected by suitable choice of the resistance $r_1$ or $r_2$ because as shown in Fig. 5 the steepness and shape of the characteristic curve relating the zero-phase-shift frequency to the value of P may be adjusted thereby until it is substantially the inverse of the corresponding microphone resistance characteristic.

Actually the two characteristic curves are not quite the same shape, but adequate compensation over a relatively wide frequency band is possible, so that practically undistorted frequency modulated waves will be obtained from the oscillator.

It may be pointed out that the variable resistance element may be used for a somewhat different purpose. Suppose a number of single frequency oscillators according to Fig. 11 have to be manufactured. Then, as is well known, the output frequency of the individual oscillators will vary within a certain small range on account of the unavoidable manufacturing variation of the elements which make up the circuit. By providing a single adjustable resistance 44 connected to tapping points on the resistances 38 and 40 determined in the manner explained, the frequency of each individual oscillator may be accurately set or trimmed by the simple adjustment of the element 44, which may then be locked if desired in any convenient manner. This forms a very inexpensive means of obtaining an accurate output frequency in a circuit employing elements made to commercial limits. This method of trimming the network may clearly be used whatever be the purpose for which the network is used. Networks such as these shown in Fig. 7 or 9 may be adjusted in the same way by providing a small trimming condenser for the element 23.

The variable element corresponding to 44 in Fig. 11 may be a semi-conducting device, such as a rectifier, which may be controlled by an adjustable voltage or current. Fig. 12 shows how the network of Fig. 2 may be arranged, using a rectifier 45 connecting the tapping points in the resistances 6 and 8. An additional resistance 46 is connected at one end to the junction point of the elements 6 and 7, and at the other end to a terminal 47. A direct current source of adjustable voltage (not shown) is intended to be connected with its positive terminal to terminal 47 and its negative terminal to terminal 4. As is well known, the effective resistance of the rectifier 45 will depend on the applied voltage, the adjustment of which will change the zero-phase-shift frequency accordingly. This provides a convenient means of remote control of the network. If the network be used as part of an oscillator circuit similar to that shown in Fig. 11 for example, the oscillation frequency may be conveniently controlled in this way. If the source connected to terminals 4 and 47 includes a source of signal voltage, the arrangement provides an alternative means of frequency modulation of the oscillations. If the rectifier 45 is reversed, then the connections at terminals 4 and 47 to the direct current source should also be reversed.

Figure 13:
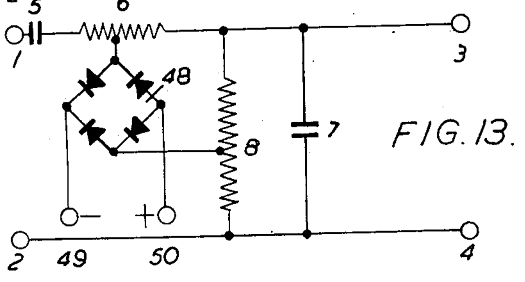

Fig. 13 shows a variation of Fig. 12 in which a bridge rectifier 48 is used instead of the single rectifier 45. In this case an extra resistance corresponding to 46 is not needed. One pair of diagonal terminals of the bridge rectifier are respectively connected to the taps on the resistances 6 and 8, and the other pair to two terminals 49 and 50, to which a direct current source (not shown) should be connected. This source may include a source of modulating signal voltage when the network is used in an oscillator circuit, as in the case of Fig. 12.

Another convenient method of controlling the zero-phase-shift frequency of a network such as any of those covered by Fig. 4 is to replace the resistance 16, or part of it, by the resistance element of an indirectly heated thermistor, the heating coil of which is connected to a source of adjustable direct or alternating current.

It will be evident that any of the networks covered by Fig. 4 may be provided with a rectifier arranged as in Fig. 12 or 13, and any such networks may be used in oscillator circuits similar to that shown in Fig. 11, or in any other manner.

What is claimed is:

1. A phase shift network of the L-type having a series and a shunt arm; the series arm comprising a capacitor and a resistor connected thereto, the shunt arm comprising a capacitor, and a resistor in parallel therewith; means for controlling the frequency at which the network provides zero phase shift consisting essentially of an additional resistor having one terminal connected to an intermediate point of said series arm resistor and the other terminal connecting to an intermediate point of said shunt arm resistor.

2. A phase shifting network of the L-type having a series and a shunt arm; each of said arms comprising a resistor and a reactive member connected thereto; means for controlling the frequency at which the network provides zero phase shift consisting essentially of an impedance member having one terminal connected to an intermediate point of a member in said series arm and the other terminal connected to an intermediate point of a member in said shunt arm, said impedance member and said members to which it is connected presenting the same type impedance.

3. A phase shifting network of the L-type having a series arm and a shunt arm; each of said arms comprising a resistor and a reactive member connected thereto; means for controlling the frequency at which the network provides zero phase shift consisting essentially of a reactance member having one terminal connected to an intermediate point of a reactive member in said series arm and the other terminal connected to an intermediate point of a reactive member in said shunt arm, said reactance member and said reactive members to which it is connected presenting the same type reactance.

4. A phase shifting network according to claim 2 wherein the members in each of said arms comprise a delta formation, and said impedance member is connected between the apices of the deltas.

5. A phase shifting network according to claim 2 wherein the impedance member is a rectifier and the members to which the impedance member is connected are resistors.

6. A phase shifting network according to claim 3 in which said reactance member and said reactive members to which the reactance member is connected are capacitors.

EDMUND RAMSAY WIGAN.

REFERENCES CITED

The following references are of record in the file of this patent:

UNITED STATES PATENTS

| Number | Name | Date |
|---|---|---|
| 1,442,781 | Nichols | Jan. 16, 1923 |
| 2,043,345 | Bobis | June 9, 1936 |
| 2,072,946 | Farnham | Mar. 9, 1937 |
| 2,093,665 | Tellegen | Sept. 21, 1937 |
| 2,173,427 | Scott | Sept. 19, 1939 |
| 2,236,985 | Bartelink | Apr. 1, 1941 |
| 2,294,863 | Hadfield | Sept. 1, 1942 |
| 2,298,177 | Scott | Oct. 6, 1942 |
| 2,300,632 | Poch | Nov. 3, 1942 |
| 2,418,842 | Kinsburg | Apr. 15, 1947 |

FOREIGN PATENTS

| Number | Country | Date |
|---|---|---|
| 839,492 | France | Jan. 4, 1939 |